Jan. 19, 1960 W. J. OESTREICHER 2,922,073

COLOR REPRODUCTION SYSTEMS OF THE CATHODE RAY TUBE TYPE

Filed March 22, 1955

INVENTOR.
WARREN J. OESTREICHER
BY
ATTORNEY

United States Patent Office 2,922,073
Patented Jan. 19, 1960

2,922,073

COLOR REPRODUCTION SYSTEMS OF THE CATHODE RAY TUBE TYPE

Warren J. Oestreicher, Flushing, N.Y., assignor to Kendon Electronics, Inc., a corporation of New York Application March 22, 1955, Serial No. 495,953
16 Claims. (Cl. 315—21)

This invention relates to cathode ray tube systems, and more specifically to the electrode structure and connections of a cathode ray tube for color reproduction such as used in color television.

One of the difficulties in the reproduction of color television is to produce cathode ray tubes of simple gun structure which can easily be operated and require relatively simple circuitry for such operation.

In known cathode ray tubes, for example the so-called Tri-Color tube, there are several gun structures which by means of a convergence lens of magnetic or electrostatic type serve to concentrate the electrons in the form of converging electron beams on adjacent color elements of the screen.

The electron beams thus produced are caused to intersect at an aperture mask arranged in front of and in line with the color elements of the screen. Thus differential intensity modulation of the beams results in proportionate differential excitation of the closely spaced phosphor elements of different colors and produces a mixture of light outputs of various controllably reproducible colors. Such multiple gun ararngements are rather expensive in construction and assembly, and difficult to operate. Another system involves the use of separate cathode ray tubes of more or less standard construction, but controlled separately by the different color hue information signals, in the manner disclosed in the publication, "A Two-Color Direct View Receiver for the RCA Color Television System," published in November 1949, by Radio Corporation of America, RCA Laboratories Division.

One of the objects of this invention is to reduce the number of electron guns to simplify electrode structures.

A specific object of this invention is in a single cathode ray tube a cathode ray television color picture tube in which hue or chrominance signals produce only chrominance changes of constant intensity or luminance while intensity or luminance signals affect only the brightness of the reproduced scene with no effect on the hue. As is well known this feature improves the immunity of the reproduction system to interference from noise and extraneous signals.

A more specific object of the invention is the complete separation of electrodes and signal injection paths involved in luminance (brightness) and chrominance (hue) reproduction.

A further object is the reduction of the average convergence angle of the beam thus reducing convergence registration problems common to multi-gun or time-shared beam tubes. In the subject invention, convergence registration error can only occur in an amount equivalent to multi-gun tubes where there is a coincidence of a high chroma area at the periphery of the phosphor screen. Thus the probability of misregistration is substantially reduced. For example, the average chrominance (expressed in percent of 100% saturated colors) in the average outdoor scene of fall foliage is approximately 12½%. Thus, in reproducing this type of scene the subject invention would have only 12.5% of the misregistration of the multi-gun tube, other things being equal (which may be effected).

Another object of this invention is to utilize a single electron beam shared simultaneously in controllably different proportions among the different color phosphor elements.

A specific object of the invention is the provision of simple electrode structures for readily utilizing available signals in proportioning the beam-sharing action among the different color phosphors.

Another object of the invention is to combine a convergence system with electrostatic deflection electrodes causing divergence, thus modifying the angle of approach of the beam to the phosphor elements.

A more specific object of the invention is to provide additional and preferably concentrically located divergence electrodes.

According to a further object of the invention, alternate electrostatic plates are alternately supplied with different signal amplitudes to obtain an adjustment of the convergence angle at the exit of the gun structure.

Another object of the invention is to compensate the differential or elliptical defocussing exerted by opposed electrodes in one pair of electrodes by opposite effects in one or more subsequent electrodes.

Still another object of the invention is an equipotential cage surrounding the deflection electrodes.

In an additional realization of the invention, second deflection plates are provided which are made slightly longer or shorter so as to reconverge the beam to its axial position at the screen when supplied with the same potential but of opposite sign as the divergence plates.

These and other objects of the invention will be more fully understood from the drawings annexed herewith in which Figs. 1 and 2 represent contemporary cathode-ray gun structures as are well known in the art.

Figure 1:
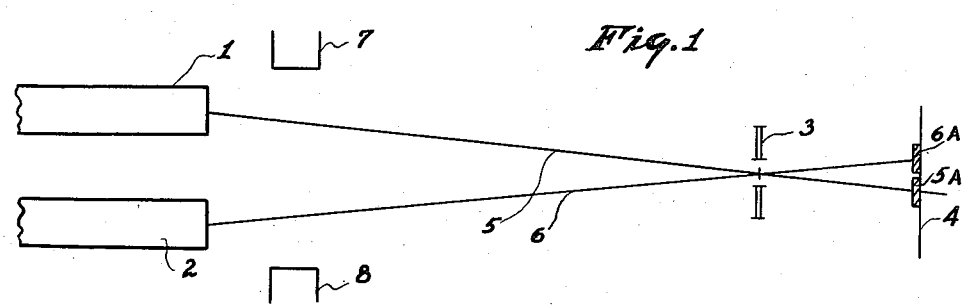

In Fig. 1 there are two electron guns 1, 2 parallelly arranged to project two cathode ray beams 5, 6 thru aperture mask 3 onto screen 4, thus illuminating respectively phosphor elements 6A, 5A.

Cathode ray beams 5, 6 are converged by means of an electrostatic or magnetic convergence lens schematically indicated in Fig. 1 at 7, 8 to intersect at aperture mask 3 so as to produce on screen 4 a beam cross-section of predetermined dimensions, and at a position determined by the angle of approach of beam to mask.

By controlling beams 5, 6 in accordance with appropriate color hue and intensity information signals, the cross-sectional areas produced by beams 5, 6 on screen 4 will assume in their respective portions impinging upon the different color strips of screen 4, different intensities and thereby reproduce the different color mixtures representing different colors.

By adding a third gun to guns 1, 2 and arranged symmetrically in space with respect to guns 1, 2 and therefore not illustrated in Fig. 1, and providing instead of pairs of color strips of a two-color system, color segments of a three-color system, reproduction of color in accordance with a three-color system can be realized.

This system has the disadvantage that it requires a high degree of accuracy in electrode construction; it also necessitates complex circuitry with complex adjustment means to effect color balance.

Figure 2:
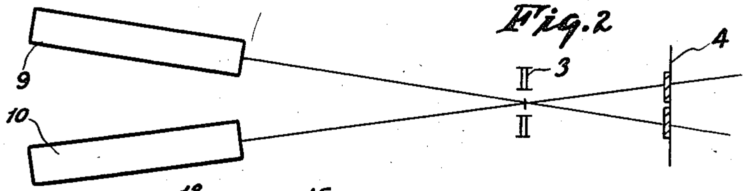

According to further prior art convergence of two electron beams can be caused by providing tilted electron guns such as shown in Fig. 2 at 9, 10 respectively.

This too requires high accuracy in electrode construction and in addition complicated circuitry of little flexibility or adjustability.

In accordance with this invention, due and intensity controls for the different colors are separated by causing hue information to be applied to electrode means arranged separately from the electrode means to which intensity information is supplied.

Figure 3:
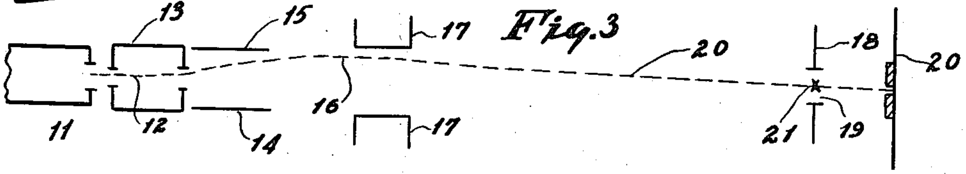
Fig. 3 represents a cathode-ray gun structure incorporating certain features of the invention.

In the embodiment of Fig. 3, this separate hue control is applied to a separate beam diverging system 14, 15 which is arranged in addition to the convergence lens or system 17, causing intersecting of the various deflected electron beams at the mask 18.

In Fig. 3 an electron gun is indicated at 11 producing a beam 12 passing first through a first focusing system 13 which focuses beam at 13A, and thereafter through a deflection or divergence system in the form of electrostatic plates 14, 15. Thereafter electron beam 12 now diverging as schematically indicated at 16A is reconverged by a magnetic or electrostatic lens 17 in otherwise well-known manner so as to be focused through aperture mask 18 and more specifically, for example, opening 19, on screen 20 at phosphor element 20A.

Application of color information signals corresponding to color hues, to divergence plates 14, 15 will cause a change in the divergence angle produced by plates 14, 15 without, however, affecting the focusing effect produced by convergence lens 17.

All that will be caused by the operation of divergence plates 14, 15 is that the electron beam emerging at 16, 16A from convergence lens 17 will pass through convergence point 21 in opening 19 at various angles thus producing on color screen 20 aligned with and controlled by aperture mask 18 various illuminations determining different color hues.

Figures 4, 5:
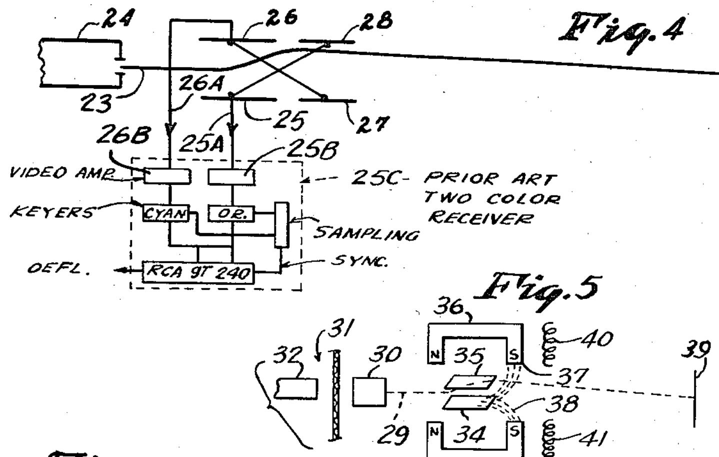
Figs. 4 and 5 represent modifications thereof.

An additional method of beam control is produced by the arrangement of two pairs of plates in the path of electron beams in cascade as indicated in Fig. 4.

In this case the electron beam emerging at 23 from a gun structure 24 is passed first through a first pair of divergence plates 25, 26 and thereafter through a second pair of convergence plates 27, 28 of different extension so as to define the amount of convergence caused in accordance with the invention. The complementary divergence-convergence actions may be derived from the same signals by electrically cross-connecting the plates of the cascaded pairs of plates by connecting for example—inside the cathode-ray tube—if desired, plate 26 to plate 27 and plate 25 to 28, and applying the signals of the color hue information to one pair of plates only, for example to plate 25, 26 respectively, which for this purpose are connected over arrowed lines 25A, 26A, to the two complementary video amplifiers 25A, 26B of a standard two-color receiver 25C such as disclosed in block diagram in Fig. 3 and in greater detail in Fig. 7 of the RCA publication mentioned above.

In these cases intensity information may be applied separately and also in well-known manner to the grid electrode—not shown—of the cathode ray tube which can be arranged in a manner well known from the art of cathode-ray tube construction.

In a further embodiment of the invention as indicated in Fig. 5, the combined divergence-convergence effects are produced in the following manner:

An electron beam 29 emerging from the Wehnelt cylinder 30 of a gun structure schematically indicated at 31 and including cathode 32 and grid 33 is directed to pass a pair of electrostatic divergence plates schematically indicated in a slightly perspective view at 34, 35 respectively.

Plates 34, 35 are arranged surrounded by a magnetic system schematically indicated at 36 and producing a field of rather well defined configuration in the following manner:

As schematically indicated in Fig. 5 magnetic system 36 is of annular shape and extends to both sides of plates 34, 35 and beyond these plates. As a result of this particular shape the magnetic field lines produced by annular system 36 are such that in the interior of the cavity formed by 36 the field lines are substantially parallel. Upon application of potential difference to plates 34, 35 the electron beam will bend in a direction parallel to plates 34, 35 and thru an angle determined by the potential field and magnetic field vector products. After leaving the plates 34, 35 it will continue in a paraxial path along the magnetic field lines.

However, after leaving plates 34, 35 and regaining a paraxial but, now, displaced path, the electrons of beam 29 will enter the fringe area of the electromagnetic field produced by system 36. This fringe area has a configuration of curved shape as schematically indicated in Fig. 5 by dotted lines 37, 38 respectively, thereby causing convergence of beam 29 on target or screen 39 in accordance with the principles set forth above in connection with the operation of the structures of Figs. 1 through 4 respectively.

Plates 34, 35 also in accordance with the principles set forth above receive the color hue information separately from the color intensity information which can be applied in otherwise well-known manner to grid electrode 33.

In the above systems, Figs. 3, 4 and 5, scanning is achieved also in well-known manner through magnetic deflection coils diagrammatically indicated at 40, 41 under control of synchronizing signals.

Figures 6, 8:
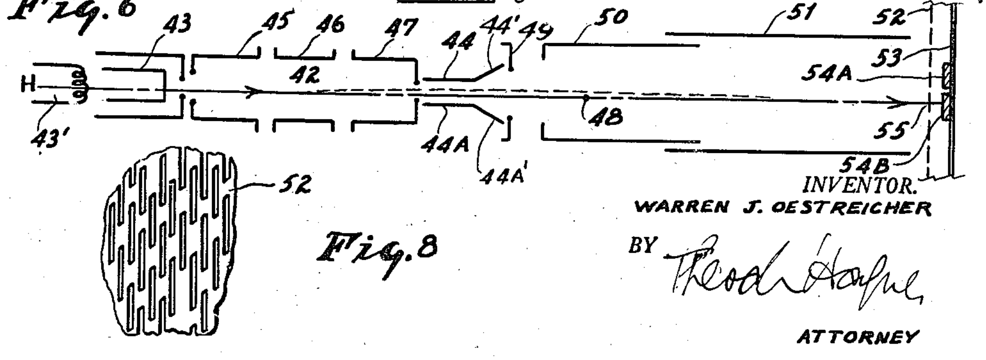
Fig. 6 represents another embodiment of the invention.
Fig. 8 shows a mask design embodied in the invention.

In the modification of the invention illustrated in Fig. 6 the electron beam schematically indicated by arrow 42 is produced from cathode 43 heated in the usual manner by a filament 43'.

Electron beam 42 is focused between the deflection plates 44, 44A by means of an electrostatic lens system consisting principally of a cascade of three cylindrical or univoltage elements 45, 46 and 47.

In this type of electrode system, beam 42 is deflected by a hue representative potential difference existing between deflecting plates 44, 44A. Plates 44, 44A are substantially parallel except at their outer end portions which may be slightly bent up as schematically indicated in Fig. 6 at 44', 44A'.

Thereafter the electrons emerging from deflection plates 44, 44A since they have been derived from a point source along the axis 48 of the cathode-ray tube (specifically a focused point between deflecting plates 44, 44A), can and will be reconverged or refocused to a point further along on axis 48 at a desired predetermined distance.

In order to achieve such reconvergence, further in accordance with this invention, lens elements 49 and 50 are provided together with another cylindrical element schematically indicated at 51 which may be formed by an Aquadag or carbon coating applied in otherwise well-known manner on the inner wall of the cathode-ray tube.

Lens system 49, 50 and 51 refocuses the various divergent beams emerging from deflecting plates 44, 44A treating such beams as a single rather widely divergent beam.

Thus, beam 42 regardless of the deflection imparted thereto by deflection system 44, 44A will reconverge to a point focus position on the multicolor element screen of the cathode-ray tube schematically in Fig. 6 at 52, after having passed through an appropriate mask 53 having apertures arrayed in registration with color elements of screen 52.

The exact angle of approach to this convergence point is a function of the angle of divergence caused by the potentials applied to deflecting plates 44, 44A, more particularly depending upon magnitude and sign of these potentials which in turn represent the color hue information.

If therefore cathode-ray beam 42 is directed to a screen element 54 containing two complementary color strips through a mask aperture 55 which is in register with the color strips 54 under control of voltages applied to deflecting plates 44, 44A, depending upon the angle of approach of beam 42 with respect to opening 55, the color elements of screen 54 will receive differential amounts of electrons, thereby producing different color effects in accordance with the color information received at this particular instance from the receiver and applied to the deflection plate 44, 44A.

At the same time intensity information is applied to the grid of the cathode-ray tube in otherwise well-known manner.

The potentials applied to the different focusing electrodes of convergence system 45, 46 and 47 may widely differ depending on the geometry of the electronic lens system involved.

In a practical application, assuming a diameter of ½ inch and a length of ½ inch for each of the two outer cylindrical electrodes 45, 47 and the same diameter but a shorter length of ¼ inch for the inner cylindrical electrode 46, the two outer end cylinders on electrodes 45, 47 are assumed to be spaced from the inner electrode 47, by a distance of about ⅛ inch. Refocusing electrode 50 may have a diameter of 1 inch and a length of 2 inches.

Based on these dimensions, the following potentials have been found to be useful for application to the different electrodes of the focusing system:

Outer electrodes 45 and 47, are to receive a relatively low voltage of plus 300 volts each with respect to cathode 43.

Inner electrode 46 should receive a voltage relatively high (5,000 volts).

The potential on electrode 49 should also be low, 300 volts, and the potential on refocusing cylinder 50 should be intermediate or 2,500 volts.

Static potentials on plates 44, 44A should average around 300 volts.

The potential on the Aquadag or final anode 51 should be around 14,000 volts.

This potential (14,000 volts) also is the approximate potential of screen 52.

Figure 7:
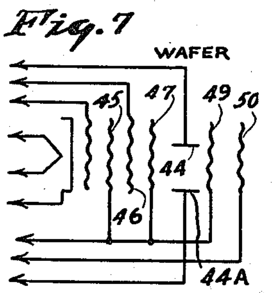
Fig. 7 shows in schematic detail a cathode-ray tube system representing a preferred embodiment of the invention.

Fig. 7 shows the connection of the various electrodes in the form of a circuit diagram.

In order to D.-C. couple the chrominance video signal to the color deflection plates; which is not indispensible but desirable, in accordance with another feature of this invention, it is required to impart to deflection plates 44, 44A, approximately the same potential as there is on the plates of the chrominance video amplifier.

In order to arrange for plates 44, 44A to be at this low potential, an appropriate lens system is selected or evolved in accordance with this invention.

In accordance with these requirements, an element of the lens system arrayed in the path of the electrons in front of deflection plates 44, 44A is required to be substantially at the same potential as deflection plates 44, 44A to avoid astigmatic defocusing due to fringing fields. This element indicated as 47 may be utilized as part of the focusing system 45, 46, 47.

In the embodiment shown in Fig. 6 this requirement involves unipotential cylinder 46 to be at a relatively high potential since 45 and 47 must be at low potential.

Since outer cylinder 45 serves as an accelerator or a "first" anode of the cathode-ray tube it may be at the same potential as the other outer cylinder 47, but the latter requirement is not indispensable. In practice this potential should be approximately at plus 200 to 400 volts with respect to cathode 43, at least for the configuration shown in Fig. 6 and for the dimensions of the order indicated above.

Electrodes 47 and 49 form an equipotential cage which serves to reduce to a minimum the effects of fringing fields at the ends of deflecting plates 44, 44A or at parts 44', 44A'.

In a further embodiment of the invention the geometry of the inner focusing electrode 46 can be so modified as to be internally connected to the potential of final anode or Aquadag coating 51 thereby eliminating a high potential lead through the socket of the cathode-ray tube.

It is further feasible in accordance with the invention to replace part or all of the focusing functions by permanent or electromagnetic fields.

As stated above, mask 52 for screen 53 serves to proportion the beam differentially over the pairs or groups of complementary color elements 54A, B (which are of course of minute size but illustrated in Fig. 6 at a scale exaggerated with respect to the electrodes) registering with the individual mask aperture, and thereby to produce different color effects at the corresponding screen portions depending upon the deflection caused by deflection plates 44, 44A, and thus the angle of approach of the beam to the mask 52.

Evidently, manufacture, assembly and operation of such screen assemblies require a great degree of accuracy and stability.

It has been found that strains occurring in the mask during manufacture, mounting and operation, very frequently impair accuracy of registration and thus cause undesired color effects.

It is therefore another object of the invention to provide a mask in which such strains are reduced to a minimum, if not eliminated, by arranging the openings of the mask in staggered arrays.

An example of such mask is shown on an enlarged scale in Fig. 8 with rows of perforated slots arranged in a staggered array.

A planar aperture mask provided with such slots can be produced and mounted with a reduced stress applied thereon.

The staggered arrays of slots cause any stress applied to the mask, due to stretching for example—whether such stretch is caused to occur during manufacture or mounting or in operation due to temperature changes, to be distributed uniformly and symmetrically throughout the mask. The stresses are most of the torsional type in the interconnecting lattice and do not approach the yield point of the material. Since the deformation is a nonlinear function near the yield point the design according to this invention avoids non-uniform displacements of the apertures with respect to the phosphor elements when heated or cooled or stressed during assembly. In this way registration defects during manufacture and operation of the cathode-ray tube are reduced to a minimum.

The invention is not limited to a size, shape, type and mode of manufacture or operation of the various elements of the tube illustrated and described but may be applied in any form or manner whatsoever without departing from the scope of this disclosure.

While the foregoing discussion has used principally monoplanar or one-dimensional beam displacements effected by pairs of deflection elements this was done for diagrammatic simplicity. It is entirely feasible to include additional appropriately placed elements for multi-dimensional beam displacement thus making available a wide range of screen phosphor element geometries and utilization of reproduction in any reasonable number of primary colors.

I claim:

1. In a cathode ray tube system, a target comprising a number of elemental areas forming a raster, each area comprising at least two primary color elements, a mask arranged in register with said target, means for directing an electron beam toward said target along the axis of the tube, and deflecting said beam under control of synchronization signals sequentially over said elemental areas, means under control of one varying hue information for continuously and additionally unilaterally diverging said beam in one predetermined direction, means under control of at least one other varying hue information for continuously and additionally unilaterally diverging said beam in at least one other direction, and means for re-converging said diverged beam so as to intersect the beam axis at said target at a continuously varying resulting angle causing said beam to be shared by the different color elements of an elemental area to an amount depending upon said information.

2. System according to claim 1, wherein said directing means include a cascade of cylinders arranged along and surrounding the path of the electrons, said cylinders being insulated from each other along said path.

3. System according to claim 2, wherein said cylinders include an intermediate cylinder and adjacent inner and outer cylinders along said tube axis, there being provided means for applying a substantially higher voltage to said intermediate cylinder than to said other cylinders.

4. System according to claim 1, comprising electrostatic means for laterally deflecting said beams.

5. System according to claim 2, comprising at least two electrostatic plates for laterally deflecting said beam.

6. System according to claim 2, comprising at least two electrostatic plates increasing in distance along the electron path for at least a portion thereof.

7. System according to claim 2, comprising at least two electrostatic plates for laterally deflecting said beam, there being provided at the end of said deflecting plates an aperture plate followed by a univoltage cylinder and an anode cylinder.

8. System according to claim 2, comprising at least two electrostatic plates for laterally deflecting said beam, said pair of plates having a distance from each other increasing along at least a portion of said tube axis, there being provided at the end of said deflecting plates an aperture plate followed by a univoltage cylinder and an anode cylinder, said anode cylinder being in the form of a carbon coating on the inner wall of the tube.

9. System according to claim 2, comprising at least two electrostatic plates for laterally deflecting said beam, said plates having a distance from each other increasing along at least a portion of said tube axis, there being provided at the end of said deflecting plates an aperture plate followed by a univoltage cylinder, said anode cylinder being in the form of a carbon coating on the inner wall of the tube extending back over and beyond said deflecting plates.

10. System according to claim 1, wherein said directing means include a cascade of cylinders arranged along and surrounding the path of the electrons, said cylinders being insulated from each other along said path, there being provided at the end of said deflecting plates an aperture plate followed by a univoltage cylinder and an anode cylinder.

11. System according to claim 1, wherein said directing means include a cascade of cylinders arranged along and surrounding the path of the electrons, said cylinders being insulated from each other along said path, there being further provided at the end of said deflecting plates an aperture plate followed by a univoltage cylinder and an anode cylinder, said anode cylinder being in the form of a carbon coating on the inner wall of the tube.

12. System according to claim 1, wherein said directing means include a cascade of univoltage cylinders arranged along and surrounding the path of the electrons, said cylinders being insulated from each other along said path, there being further provided at the end of said deflecting plates an aperture plate followed by another univoltage cylinder and an anode cylinder, said anode cylinder being in the form of a carbon coating on the inner wall of the tube, extending back over and beyond said deflecting plates, and means for connecting said anode with at least one of said cascaded cylinders.

13. System according to claim 1, comprising two groups of electrostatic deflecting plates in cascade arrangement along the path of the electron beam, the second group being of substantially different length than the first group of plates.

14. System according to claim 1, comprising two groups of electrostatic deflecting plates arranged in cascade along the path of said electron beam and internally cross-connected with each other.

15. System according to claim 1, comprising two groups of electrostatic deflecting plates arranged in cascade along the path of said electron beam and internally cross-connected with each other, the second group of plates being substantially different in length than the first group of plates.

16. System according to claim 1, comprising two groups of electrostatic deflecting plates arranged in cascade along the path of the electron beam and separately connected to outside terminals of the tube.

References Cited in the file of this patent

UNITED STATES PATENTS

| | | |
|---|---|---|
| Re. 23,838 | Rajchman | June 8, 1954 |
| 2,118,865 | Schlesinger | May 31, 1938 |
| 2,206,666 | Epstein | July 2, 1940 |
| 2,225,479 | Jonker | Dec. 17, 1940 |
| 2,332,622 | Calbrick | Oct. 26, 1943 |
| 2,611,099 | Jenny | Sept. 16, 1952 |
| 2,623,190 | Roth | Dec. 23, 1952 |
| 2,634,326 | Goodrich | Apr. 7, 1953 |
| 2,643,352 | Parker | June 23, 1953 |
| 2,663,757 | Lubcke | Dec. 22, 1953 |
| 2,672,575 | Werenfels | Mar. 16, 1954 |
| 2,677,723 | McCoy | May 4, 1954 |
| 2,696,571 | Law | Dec. 7, 1954 |
| 2,711,493 | Lawrence | June 21, 1955 |
| 2,728,011 | Goldsmith | Dec. 20, 1955 |
| 2,784,342 | Van Overbeek | Mar. 5, 1957 |